(12) United States Patent
Shima et al.

(10) Patent No.: US 11,986,982 B2
(45) Date of Patent: May 21, 2024

(54) INJECTION MOLDING SYSTEM USING MULTIPLE MOLDS

(71) Applicant: Canon Virginia, Inc., Newport News, VA (US)

(72) Inventors: Tomohiro Shima, Yorktown, VA (US); Tomoaki Hokyo, Foothill Ranch, CA (US)

(73) Assignees: Canon Virginia, Inc., Newport News, VA (US); Canon U.S.A., Inc., Melville, NY (US)

( * ) Notice: Subject to any disclaimer, the term of this patent is extended or adjusted under 35 U.S.C. 154(b) by 80 days.

(21) Appl. No.: 17/487,755

(22) Filed: Sep. 28, 2021

(65) Prior Publication Data
US 2023/0098527 A1    Mar. 30, 2023

(51) Int. Cl.
*B29C 45/07* (2006.01)
*B29C 45/17* (2006.01)
*B29C 45/47* (2006.01)
*B29C 45/64* (2006.01)
*B29C 45/84* (2006.01)

(52) U.S. Cl.
CPC ........ *B29C 45/076* (2013.01); *B29C 45/1744* (2013.01); *B29C 45/47* (2013.01); *B29C 45/64* (2013.01); *B29C 45/84* (2013.01); *B29C 2945/76083* (2013.01); *B29C 2945/76394* (2013.01); *B29C 2945/76558* (2013.01)

(58) Field of Classification Search
None
See application file for complete search history.

(56) References Cited

U.S. PATENT DOCUMENTS

| | | | |
|---|---|---|---|
| 11,104,050 B2 | 8/2021 | Nakamura | |
| 2005/0098911 A1 | 5/2005 | Korneff | |
| 2013/0302468 A1 | 11/2013 | Ikea | |
| 2018/0009146 A1 | 1/2018 | Nakamura | |
| 2021/0078227 A1 * | 3/2021 | Horiuchi | B29C 45/62 |

FOREIGN PATENT DOCUMENTS

| | | | | |
|---|---|---|---|---|
| DE | 1267418 A | | 5/1968 | |
| JP | S6225023 A | * | 2/1987 | ........... B29C 45/076 |
| JP | 3577898 B2 | | 10/2004 | |
| JP | 2008230148 A | | 10/2008 | |
| JP | 6121601 B1 | | 4/2017 | |

* cited by examiner

*Primary Examiner* — Armand Melendez
(74) *Attorney, Agent, or Firm* — Canon U.S.A., Inc., IP Division

(57) ABSTRACT

An injection molding system including an injection nozzle that injects resin into a mold and a conveying device that conveys the injection nozzle between a first position where the injection nozzle injects resin into a first mold and a second position where the injection nozzle injects resin into a second mold.

18 Claims, 9 Drawing Sheets

INJECTION MOLDING SYSTEM USING MULTIPLE MOLDS

FIELD

The disclosure relates to an injection molding system for manufacturing plastic components.

BACKGROUND

Current manufacturing of a molded part by an injection molding system includes clamping a mold, injecting a resin into the mold, pushing the resin into the mold at high pressure to compensate for volume reduction caused by solidification of the resin, securing a molded part in the mold until the resin solidifies, and removing the molded part from the mold. Each of these injection molding steps is repeated as needed.

After performing a molding process a predetermined number of molds with a mold, the molds are unloaded from an injection molding system. A changeover for a new mold is performed, and the new mold is inserted into the injection molding system. The new mold is then used for a predetermined number of injection molding cycles. This process often takes time and resources, and typically the injection molding system remains in a standby state during this process. This can impact overall productivity. In addition, since molds are typically heavy and heated during use, it is necessary to consider the operator safety.

In order to increase productivity, a method using two molds per injection molding system has been proposed. For example, Japanese Patent Publication No. 6121601 describes a system in which two conveying devices independent of an injection molding machine are placed on both sides of the injection molding machine. In this system, molded parts are manufactured while multiple molds are replaced by a conveying device for one injection molding machine. The conveying device used in the injection molding system of Japanese Patent Publication No. 6121601 includes independent drive sources for each mold and a controller independent from the injection molding machine, which complicates the system.

SUMMARY

An injection molding system including an injection nozzle that injects resin into a mold and a conveying device that conveys the injection nozzle between a first position where the injection nozzle injects resin into a first mold and a second position where the injection nozzle injects resin into a second mold.

Figure 1:
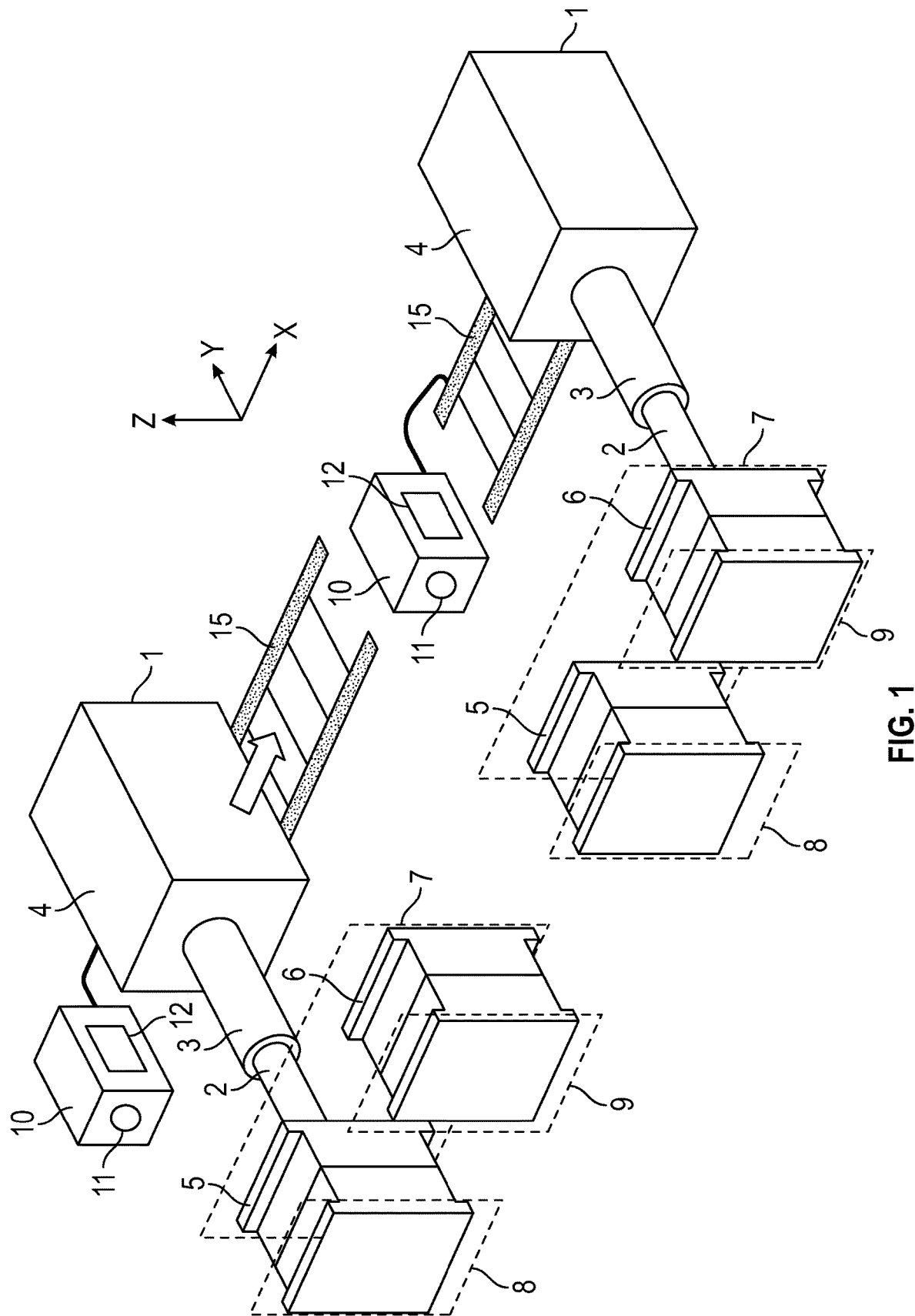
FIG. 1 illustrates an injection molding system according to exemplary embodiment.

Throughout the Figures, the same reference numerals and characters, unless otherwise stated, are used to denote like features, elements, components or portions of the illustrated embodiments. While the subject disclosure is described in detail with reference to the Figures, it is done so in connection with the illustrative exemplary embodiments. It is intended that changes and modifications can be made to the described exemplary embodiments without departing from the true scope and spirit of the subject disclosure as defined by the appended claims.

DESCRIPTION OF THE EMBODIMENTS

An injection molding system according to an exemplary embodiment will be described with reference to the drawings. In each of the drawings, arrows X and Y denote horizontal axis directions orthogonal to each other, and arrows Z denote vertical axis directions.

Figure 7:
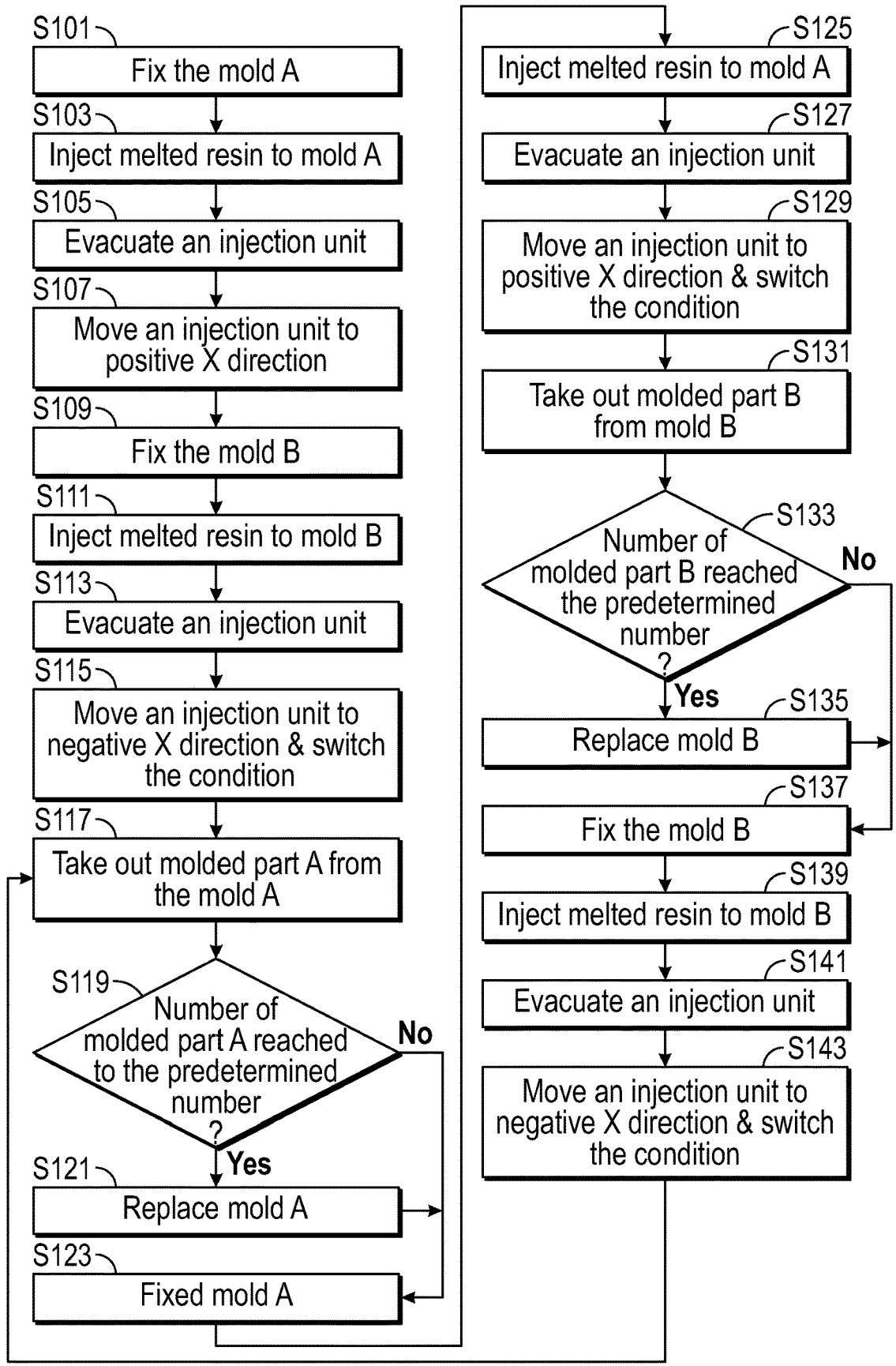
FIG. 7 is a flowchart illustrating an operation of an injection molding system according to an exemplary embodiment.

An operation of the injection molding system FIG. 1 according to an exemplary embodiment will be described in detail below with reference to FIG. 1 and FIG. 7. FIG. 1 illustrates an injection molding system 1 according to an exemplary embodiment. The left side of FIG. 1 illustrates a pre-conveyance of molds while the right side illustrates post conveyance of molds. FIG. 7 is a flow chart illustrating an operation of the injection molding system 1 according to an exemplary embodiment. Each of the steps described with reference to FIG. 7 is realized by a processor (controller 12) of the injection molding system 1 reading and executing a predetermined program stored in a memory.

The injection molding system 1 includes an injection unit 4 having an injection nozzle 2 and an injection cylinder 3. The injection molding system 1 also includes a fixed platen 7 to which a mold A 5 and a mold B 6 can be attached to the injection unit 4. The injection unit 4 is conveyed to perform a molding process using the mold A 5 and the mold B 6. The mold A 5 is attached to a first movable platen 8 and the mold B 6 is attached to a second movable platen 9, which enables each respective mold to be individually opened and closed. The injection unit 4 is conveyed by the conveying device 10.

More specifically, the conveying device 10 conveys the injection unit 4 by supplying power to a conveying table 15. In the present embodiment, the conveying table 15 includes multiple transfer rollers (not illustrated) along the X-axis direction. The power provided by the conveying device 10 rotates the transfer rollers to convey the injection unit 4. However, this approach is not seen to be limiting. In another exemplary embodiment for example, the conveying table 15 can be implemented as a chain conveyor, a belt conveyor, etc.

A detector 11 detects a conveyance state of the injection unit 4. A controller 12 controls conveyance of the injection unit 4 based on a result of the detection. More specifically, the detector 11 detects the amount of movement of the injection unit 4. When the amount of movement of the injection unit 4 detected by the detector 11 reaches a predetermined value, the controller 12 determines that the conveyance of the injection unit 4 is completed and stops the conveyance.

In another exemplary embodiment, the detector 11 can detect a position of the injection unit 4. This can be accomplished by the detector 11 detecting a positional relationship between the injection unit 4 and the fixed platen 7 or a mold. When the injection unit 4 and the fixed platen 7 or a mold reach a specific positional relationship, the controller 12 determines that conveyance of the injection unit 4 is completed and stops the conveyance.

In yet another exemplary embodiment, the detector 11 can detect whether a mold is present at a specific position in a platen of the injection molding system 1. In this embodiment, if the detector 11 does not detect a mold, the controller 12 does not convey the injection unit 4 due to safety reasons. In one embodiment, a detector that detects the conveying state of the injection unit 4 and a detector that detects the presence of a mold can be included in the same structure/housing in the injection molding system. In another embodiment, the detectors can be independent of each other.

Turning to FIG. 7, in step S101, the mold A 5 is secured by the fixed platen 7 and the first movable platen 8. Melted resin mixed in the injection cylinder 3 is fed into the injection nozzle 2. A process of melting and mixing the resin according to the present embodiment will be described below with respect to FIG. 9. Next, in step S103, resin fed into the injection nozzle 2 is injected into the mold A 5, and a cooling time counting for the mold A 5 begins.

Plasticization conditions and injection conditions of the resin to the mold A 5 are executed under a preset condition A. For example, preset condition A can include setting resin temperature, an injection filling speed, and a packing pressure so that a flowability of resin can be secured in a mold.

After the cooling time counting begins, in step S105, the injection unit 4 is retracted at a specified timing, and the injection nozzle 2 is separated from the mold A 5. Then, in step S107, the injection unit 4 moves in a positive X-axis direction (FIG. 1), and the plasticizing condition and injection condition are switched from a preset condition A to a preset condition B in preparation for an injection molding operation for mold B 6. Preset conditions A and B can either be the same condition or different conditions. The left side of FIG. 1 illustrates the injection molding system 1 before movement of the injection unit 4 in step S107, while the right side of FIG. 1 illustrates the injection molding system 1 after movement of the injection unit 4 in step S107.

In step S109, the mold B 6 is fixed using the fixed platen 7 and the second movable platen 9. In step S111, the injection unit 4 is moved towards the mold B 6, and when the injection nozzle 2 contacts the mold B 6, resin is injected into the mold B 6. A cooling time counting for the mold B 6 is then started.

In step S113, after the cooling time counting is started, the injection unit 4 is retracted at a specified timing, and the injection nozzle 2 separates from the mold B 6. Then, in step S115, the injection unit 4 is moved in a negative X-axis direction (FIG. 1), and the plasticizing condition and the injection condition are switched from preset condition B to preset condition A for an injection molding operation for the mold A 5.

In step S117, when the cooling time to the mold A 5 elapses, the mold A 5 is opened by a mold opening operation, and a resin molded part A (not illustrated) in the mold A 5 removed. Next, in step S119a determination is made whether the number of resin molded parts produced by the mold A 5 has reached a predetermined number. If the predetermined number is reached, flow proceeds to step S121. In step S121, the mold A 5 is replaced with another mold. If the predetermined number has not been reached, flow proceeds to step S123.

In step S123, the mold A 5 is closed and clamped by the first movable platen 8. Then in step S125, resin melted under preset condition A is injected into the mold A 5, and cooling time counting begins.

In step S127, after the cooling time counting begins, the injection unit 4 is retracted at a specified timing, and the injection nozzle 2 separates from the mold A 5.

Then, in step S129, the injection unit 4 moves in a positive X-axis direction (FIG. 1), and the plasticizing condition and the injection condition are switched from preset condition A to a preset condition B in preparation for an injection molding operation for mold B 6. Preset conditions A and B can either be the same condition or different conditions.

In step S131, when the cooling time to the mold B 6 elapses, the mold B 6 is opened by a mold opening operation, and a resin molded part B (not illustrated) in the mold B 6 is removed. Next, in step S131, a determination is made whether the number of resin molded parts produced by the mold B 6 has reached a predetermined number. If the predetermined number is reached, flow proceeds to step S135. In step S135, the mold B 6 is replaced with a different mold. If the predetermined number has not been reached, flow proceeds to step S137.

In step S137, the mold B 6 is closed and clamped by the second movable platen 9. Then, in step S139, resin melted under the pre-set condition B is injected into the mold B 6, and the cooling time counting begins.

In step S141, after the cooling time counting begins, the injection unit 4 is retracted at a specified timing, and the injection nozzle 2 separates from the mold B 6. Next, in step S143, the injection unit 4 is moved in a negative X-axis direction (FIG. 1), and the plasticizing condition and the injection condition are switched from the preset condition B to preset condition A for an injection molding operation for mold B 6.

As described above, in the present embodiment, by repeating an injection molding operation with respect to a mold while repeating movement of the injection unit 4 in the X-axis direction, resin can be injected into and fill one mold during a cooling process of another mold, which results in productivity improvement. In addition, moving the injection unit 4 instead of moving the molds can reduce the overall size of the injection molding system 1.

In the present embodiment, securing of the mold A 5 (step S101) and the B 6 (step S109) are performed at separate instances. In another exemplary embodiment, the mold A 5 and the mold B 6 can be simultaneously secured in, for example, step S101.

Figure 9:
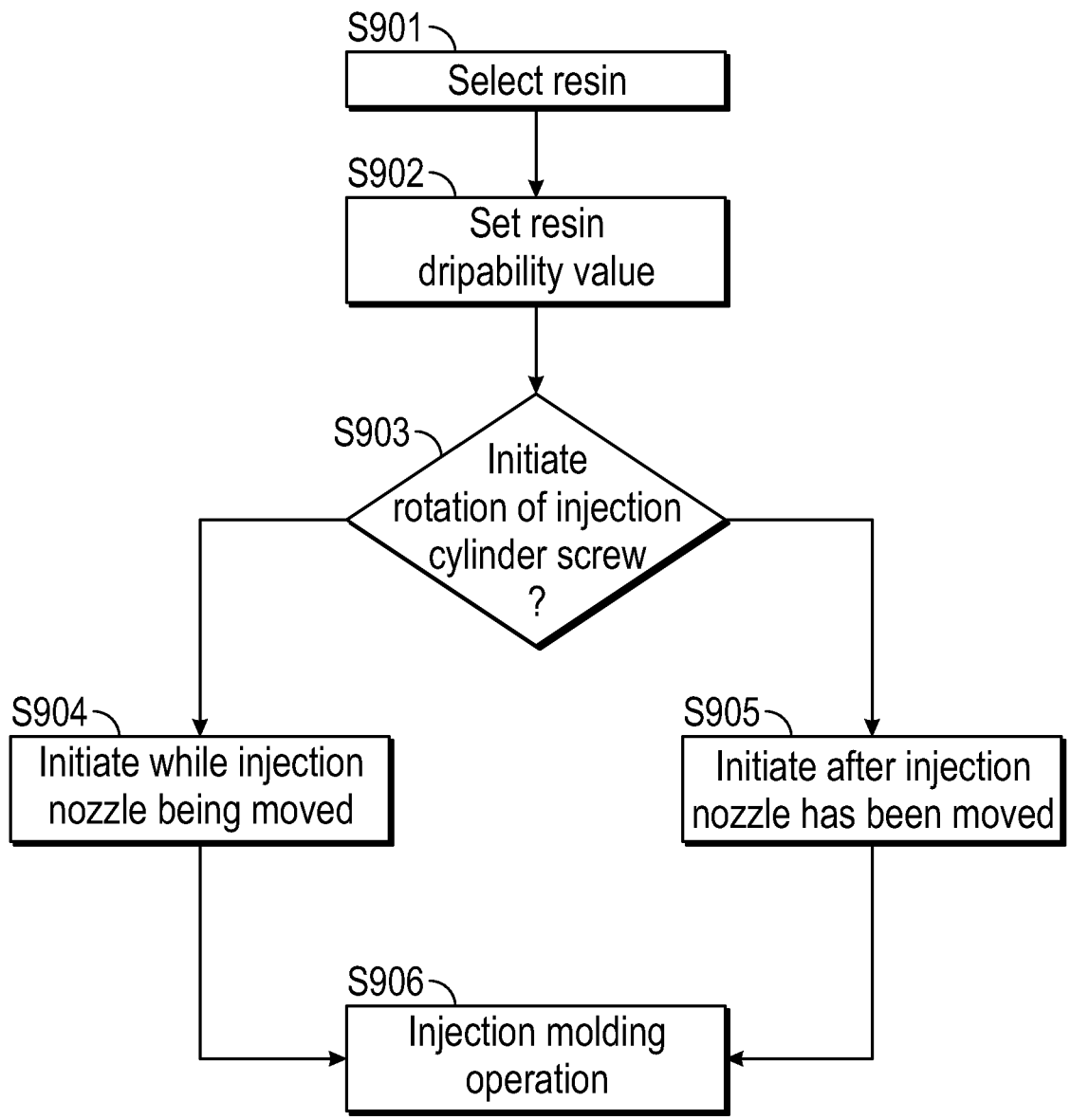
FIG. 9 is a flowchart illustrating preparing an injection molding system to inject resin into a mold according to an exemplary embodiment.

FIG. 9 is a flowchart illustrating preparing the injection molding system 1 to inject resin into a mold according to an exemplary embodiment. In step S901, the resin to be used for an injection molding operation is selected. The resin at this point is typically in a solid state, like in the form of a pellet. The resin also typically has one or more parameters that represent a tendency of the rein to drip, herein referred to as "dripability", when melted and mixed. In the present embodiment, the parameter can be a fluidity value of the resin, a melt flow rate of the resin, a melt index of the resin, a pressure during kneading of the resin, a temperature of the injection nozzle 2, a temperature of the injection cylinder 3, or any combination thereof. These are not seen to be limiting, and any operational related value that would enable practice of the present embodiment is applicable.

In step S902, a dripability value is set based on a parameter or any combination of parameters. Next, in step S903, a determination is made when to initiate rotation of a screw (not illustrated) of the injection cylinder 3. The term "screw" is not seen to be limiting and any structure that would enable practice of the present embodiment(s) is applicable. The determination in step S903 is made based on the parameter or combination of parameters.

Rotation of the screw enables introduction of the resin, in its solid state form, into the injection cylinder 3. The rotation also enables moving the resin towards the end of the injection cylinder 3 closest to the injection nozzle. Since the temperature of the portion of the injection cylinder 3 closest to the injection nozzle is typically hotter than the portion nearest the injection unit 4, as the rotation of the screw moves the resin, the resin begins to melt and the rotation action of the screw mixes the melted resin.

Based on the result of the determination in step S903, in step S904, the rotation of the screw is initiated while the injection nozzle 2 is being moved from one position to another position or in step S905, the rotation of the screw is initiated after the injection nozzle 2 has been moved from one position to another position.

More specifically, if, in step S903, the parameter or combination of parameters represent that the dripability of the resin is low, i.e., the resin does not tend to drip, then rotation of the screw is initiated while the injection nozzle 2 is being moved from one position to another position (S904). If the parameter or combination of parameters represent that the dripability of the resin is high, i.e., the resin tends to drip, then rotation of the screw is initiated after the injection nozzle 2 has been moved from one position to another position (S905). In step S906, an injection molding operation as described above with respect to FIG. 7 is then performed.

In the present embodiment, the process illustrated in FIG. 9 is executed before step S103 and/or Step S113 for mold A 5 and after step S105 for mold B 6. For example, after step S105, a determination, based on a parameter or combination of parameters, is made whether to initiate rotation of the screw of the injection cylinder 3 after the conveying device 10 completes conveying the injection nozzle 2 from a first position where resin was injected into the mold A 5 to a second position for injecting the resin into the mold B 6 or to initiate rotation of the screw of the injection cylinder 3 while the conveying device 10 conveys the injection nozzle 2 from the first position to the second position.

If the parameter or combination of parameters represent that the dripability of the resin is low, rotation of the screw in the injection cylinder 3 is initiated 3 during movement of the injection nozzle 2 in step S107. If the parameter or combination of parameters represent that the dripability of the resin is high, rotation of the screw of the injection cylinder 3 is initiated after movement of the injection nozzle 2 in step S107 is completed, but before resin is injected in step S111.

In an exemplary embodiment, it can be determined to initiate rotation of the screw of the injection cylinder 3 after movement of the injection nozzle 2 in step S107 completes, but before resin is injected in step S111, if a fluidity value of the resin is greater than a predetermined threshold fluidity value. In another exemplary embodiment, it can be determined to initiate rotation of the screw of the injection cylinder 3 while the injection nozzle 2 is moving (step S107) if a fluidity value of the resin is less than or equal to a predetermined threshold fluidity value. In yet another exemplary embodiment, it can be determined to initiate rotation of the screw of the injection cylinder 3 before the injection nozzle 2 is moved in step S107 if a fluidity value of the resin is less than or equal to a predetermined threshold value.

In another exemplary embodiment, it can be determined to initiate rotation of the screw of the injection cylinder 3 after movement of the injection nozzle 2 in step S107 completes, but before resin is injected in step S111, if a temperature of the injection nozzle 2 is greater than a predetermined threshold temperature. In another exemplary embodiment example, it can be determined to initiate rotation of the screw of the injection cylinder 3 while the injection nozzle 2 is moving (step S107) if a temperature of the injection nozzle 2 is less than or equal to a predetermined threshold value.

In another exemplary embodiment, the injection molding system 1 can include a switching unit (not illustrated) that enables manual switching of an operational mode of the injection molding system 1. In the present embodiment, a first mode is where initiating rotation of the screw of the injection cylinder 3 occurs after movement of the injection nozzle 2 in step S107 completes, but before resin is injected in step S111, and a second mode is where initiating rotation of the screw of the injection cylinder 3 occurs while the injection nozzle 2 is moving (step S107).

In another exemplary embodiment, a type of resin to be injected into the mold B 6 can be specified. If the dripability of a type of resin to be injected into the mold B 6 is high such that it will drip from the injection nozzle 2 while the injection nozzle 2 is moved, it can be determined to initiate rotation of the screw of the injection cylinder 3 after the injection nozzle 2 is moved from a first position to a second position.

In another exemplary embodiment, regardless of the parameter used in the above-described determination, melting, mixing, etc., of the resin can be performed after switching of modes as described above while the injection unit 4 is being moved.

In another exemplary embodiment, regardless of the parameter used in the above-described determination, switching of the mode, the melting, mixing, etc., of the resin can be completed after the injection unit 4 is retracted in step S105 and before the injection unit 4 begins to move in step S107.

In another exemplary embodiment, regardless of the parameter used in the above-described determination, switching of the molding conditions, the melting, mixing, etc., of the resin can be started after the injection unit 4 is moved in step S107 but before resin is injected in step S111.

Figure 8:
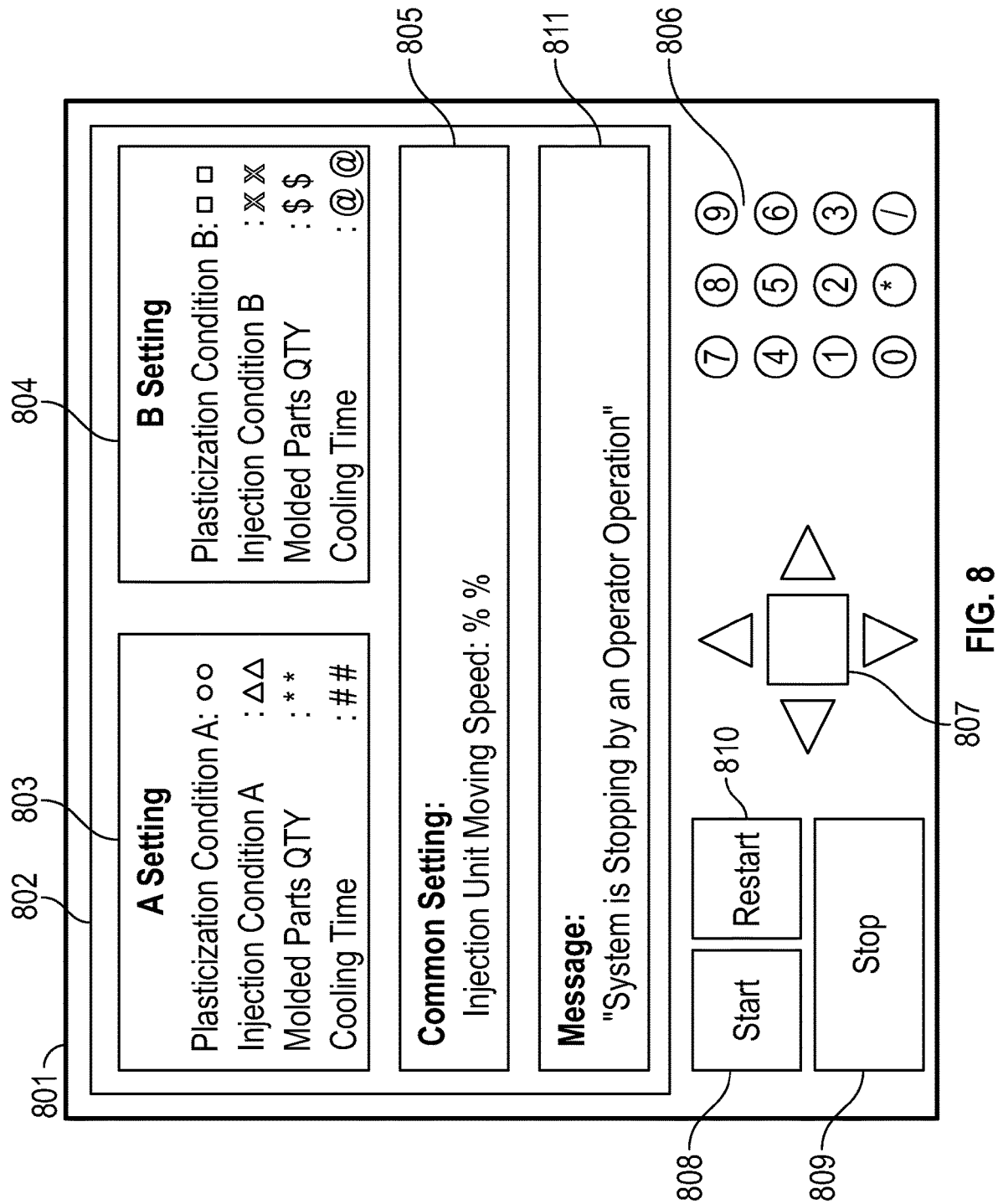
FIG. 8 illustrates a control panel of a display according to an exemplary embodiment.

FIG. 8 illustrates a user interface that an operator can use to operate, the injection unit 4. The user interface includes a control panel 801 that includes a display area 802 to display various settings, a display area 803 to display settings related to the mold A 5, a display area 804 to display settings related to the mold B 6, and a display area 805 to display settings common to the mold A 5 and the mold B 6. Numeric keypad 806 enables inputting values related to various settings, cross key and a determination button 807 enables selecting a setting to be changed, start button 808 starts the above-described process of FIG. 7, stop button 809 stops the process and, resume button 810 resumes the stopped process.

Message space 811 provides for displaying a message notifying an operator of the current state of the injection molding system 1. For example, "System is stopping by an operator operation" indicates that the injection molding system 1 has currently been stopped due to operator input. Other messages can include, for example, include: "Mold changing in progress", "System down due to the absence of the mold in the platen", and "System down due to an unexpected obstruction in the movement of the injection unit 4", etc. . . . . After confirming the cause as to why the injection molding systems 1 stopped based on the message displayed in the message space 811, the reason cause can be addressed, and operation of the injection molding system 1 can resume by selection of the resume button 810.

In the present embodiment, control panel 801 is installed on a conveying table cover (not illustrated) that covers the conveying table 15. However, this positioning of the control panel 801 is not seen to be limiting, and it can be positioned in any location that would enable practice of the present embodiment.

The controller 12 in the present embodiment has been described as being implemented as part of the conveying device 10. In addition to executing the steps in FIG. 7, the controller 12 also executes processing to control the operations provided the control panel 801 as described above. In another exemplary embodiment, the controller 12 can be provided as part of the control panel 801. In still yet another exemplary embodiment, a controller (not illustrated) different from controller 12 can be used to execute the steps of FIG. 7 or the processing to control the operations provided by the control panel 801.

Figure 2:
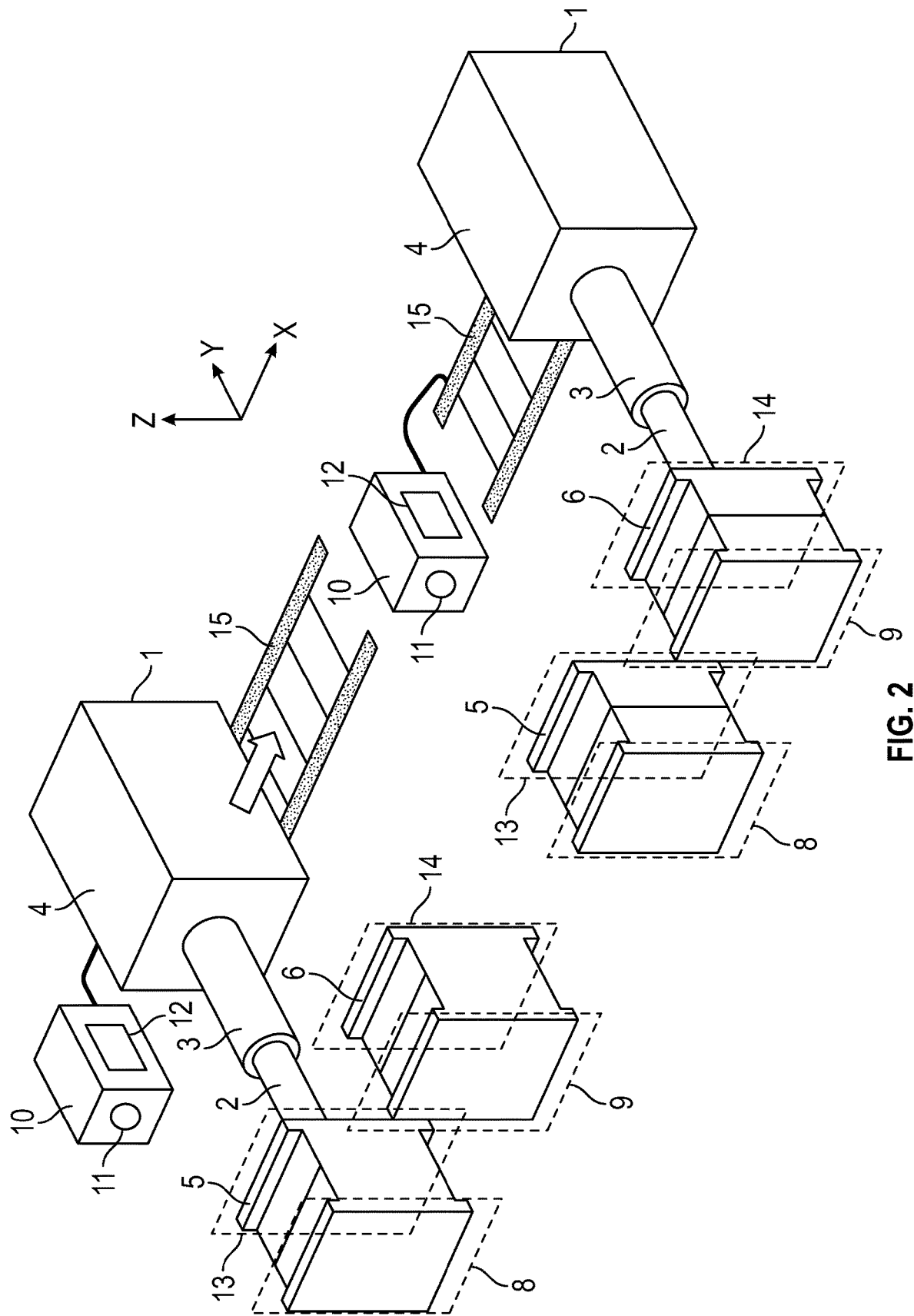
FIG. 2 illustrates an injection molding system according to another exemplary embodiment.

FIG. 2 illustrates another exemplary of injection molding system 1. In FIG. 2, the common fixed platen 7 of FIG. 1 is divided into a first fixed platen 13 and a second fixed platen 14. This structure enables reduction in a size and enables connecting a temperature adjusting hose (not illustrated) and a hot runner cable (not illustrated) in between the mold A 5 and the mold B 6. The process of FIG. 7 described above is applicable to the operation of the injection molding system 1 of FIG. 2.

Figure 3:
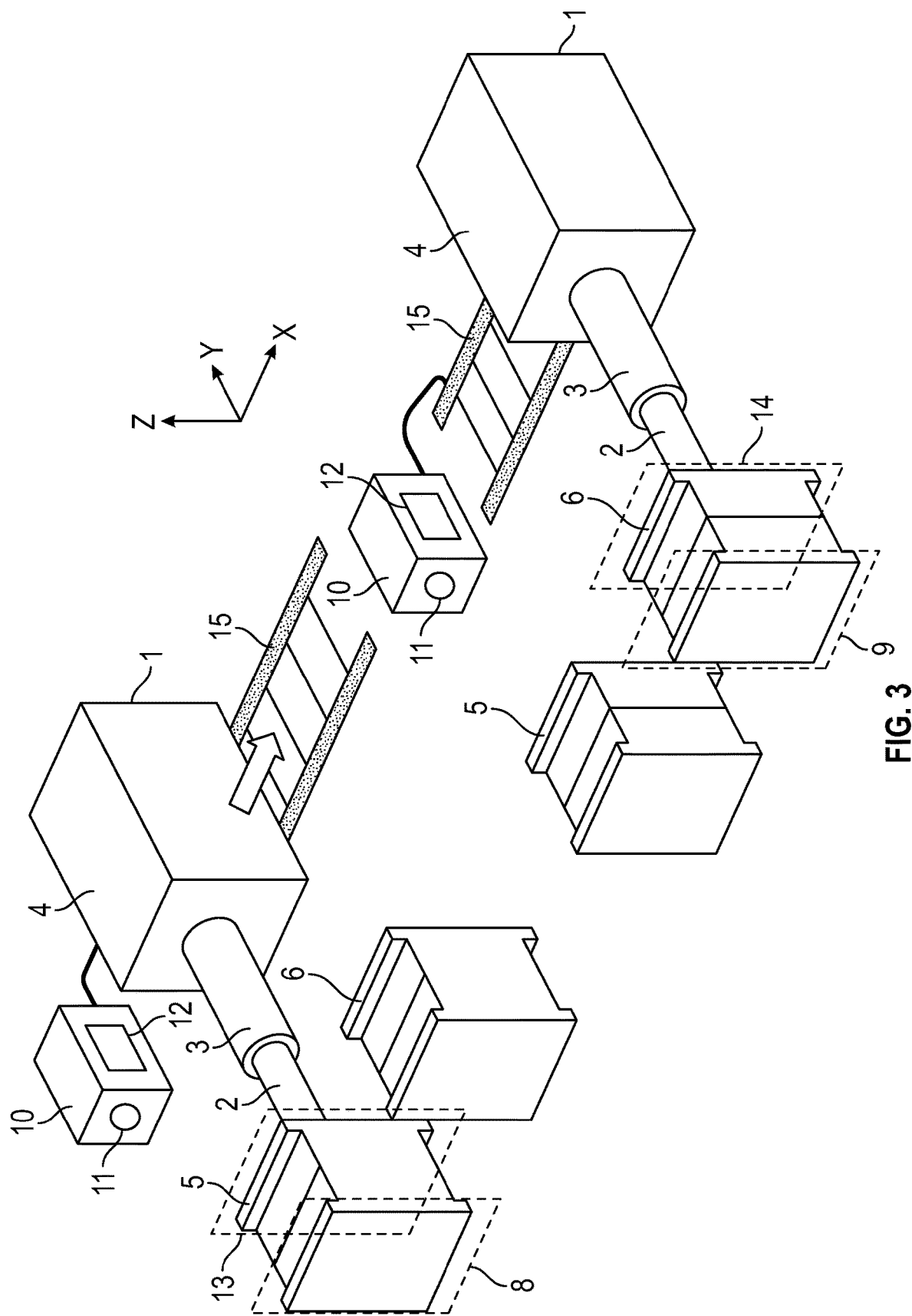
FIG. 3 illustrates an injection molding system according to yet another exemplary embodiment.

FIG. 3 illustrates yet another exemplary embodiment of the injection molding system 1. FIG. 3 does not include, the second fixed platen 14 and the second movable platen 9 illustrated in FIG. 2. According to the present embodiment, in both step S107 and step S129 of FIG. 7, the first fixed platen 13 and the first movable platen 8 are conveyed together with the injection unit 4 in a positive X-axis direction, and are used to fill the mold B 6 with resin. In both step S115 and S143, the first fixed platen 13 and the first movable platen 8 are conveyed together with the injection unit 4 in a negative X-axis direction, and are used to fill the mold A 5 with resin. This enables a single structure to include the injection unit 4, the fixed platen 14, and the movable platen 8, and a clamping force generating device (not shown) can be made to be one, which can reduce overall cost of the injection molding system 1.

Figure 4:
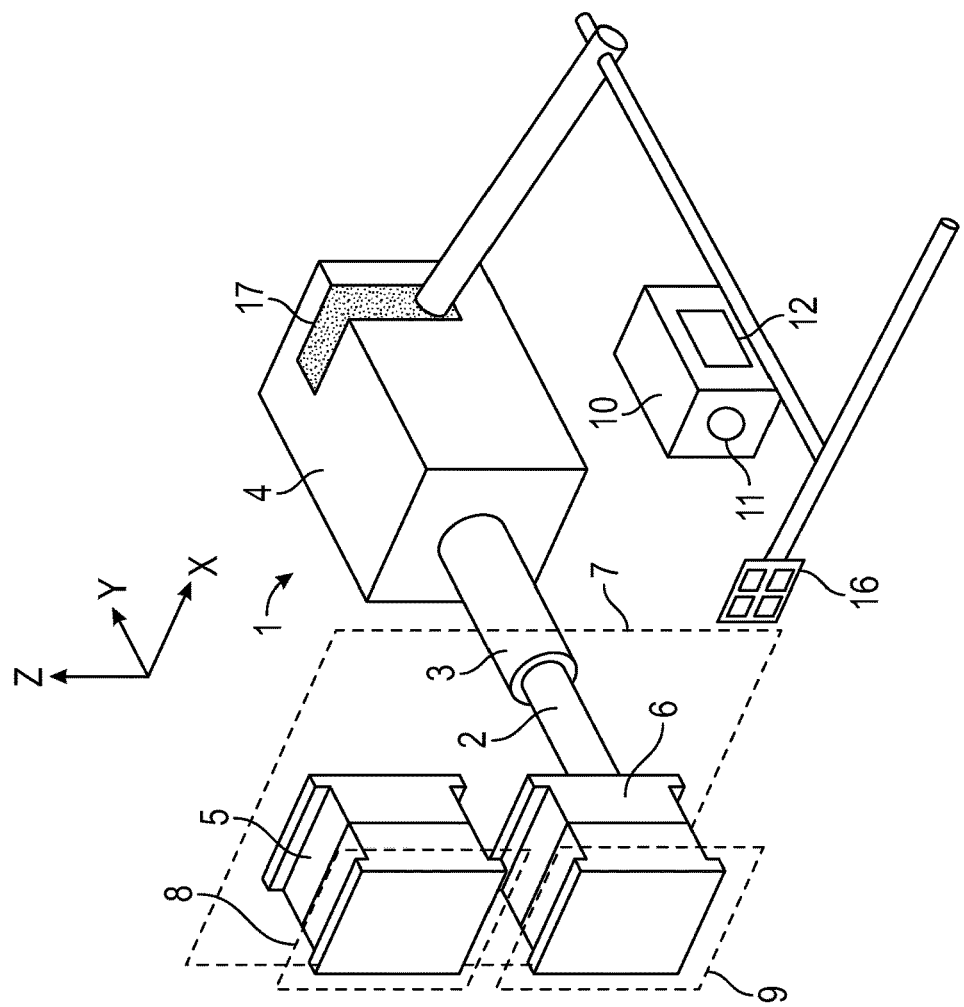
FIG. 4 illustrates an injection molding system according to still yet another exemplary embodiment.
Figure 4:
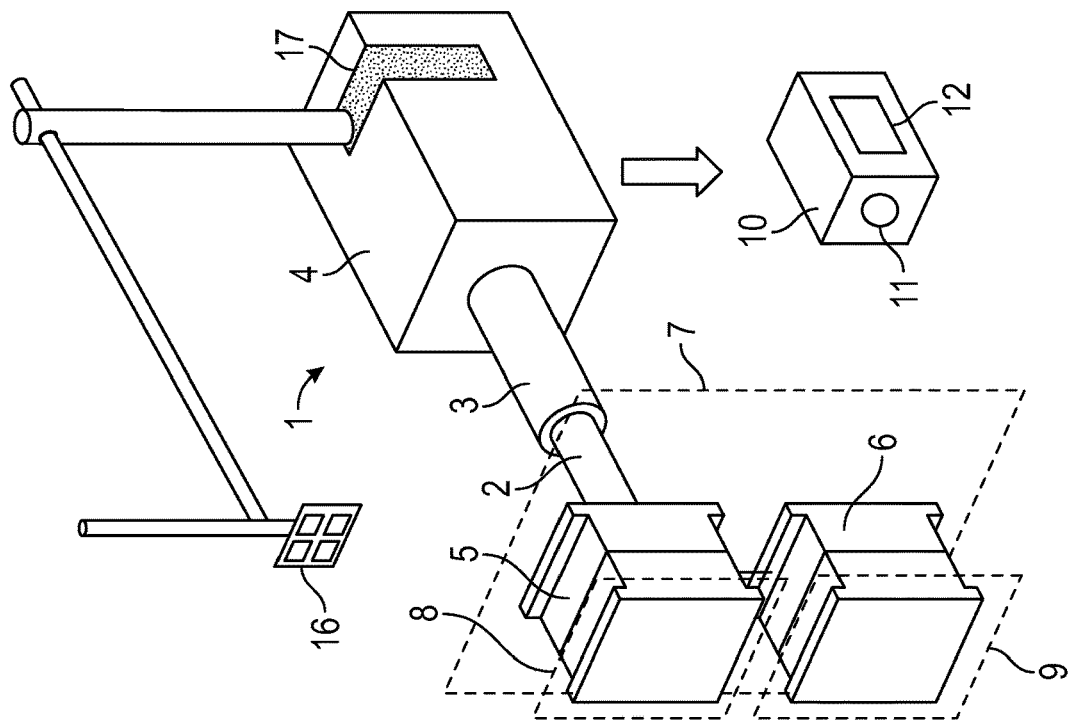

FIG. 4 illustrates still yet another exemplary embodiment of the injection molding system 1. In FIG. 4, the conveying direction of the injection unit 4 is in a Z-axis direction. Thus, arrangement of the mold A 5 and the mold B 6 is a Z-axis direction, which results in the conveying direction of the injection unit 4 in step S107, S115, S129, and S143 of FIG. 7 is in a Z-axis direction. The injection molding system 1 of the present embodiment includes an elevating mechanism (not illustrating), where the conveying device 10 controls the elevating mechanism.

Due to the orientation of FIG. 4, the manner in which a molded part is removed from the mold A 5 is different from the manner in which a molded part is removed from the mold B 6. More specifically, a removal robot 16 approaches the mold A 5 from above, i.e., moves in a Z-axis direction, to enter the mold A 5 when removing a molded part. The removal robot 16 approaches the mold B 6 from the side, i.e., moves in an X-axis direction, to enter the mold B 6 when removing a molded part. The removal robot 16 can move along a guide component 17. While in the present embodiment, a single removal robot removes a molded part from both the mold A 5 and the mold B 6, in another exemplary embodiment, a removal robot A can be provided for the mold A 5 and a different removal robot can be provided for the mold B 6.

Figure 5:
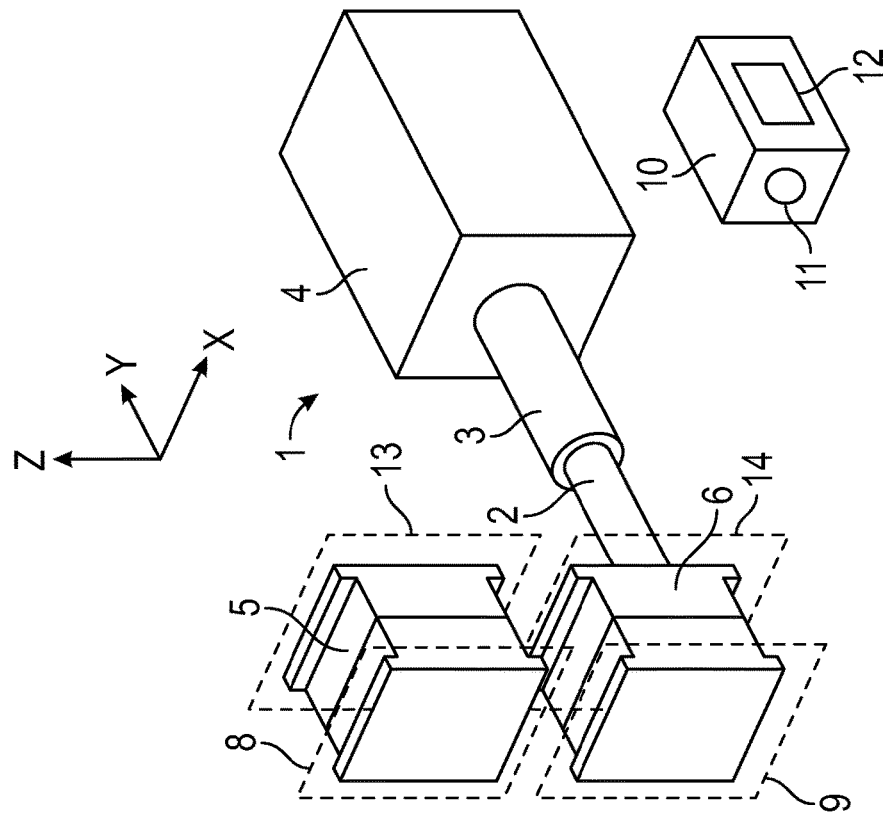
FIG. 5 illustrates an injection molding system according to another exemplary embodiment.
Figure 5:
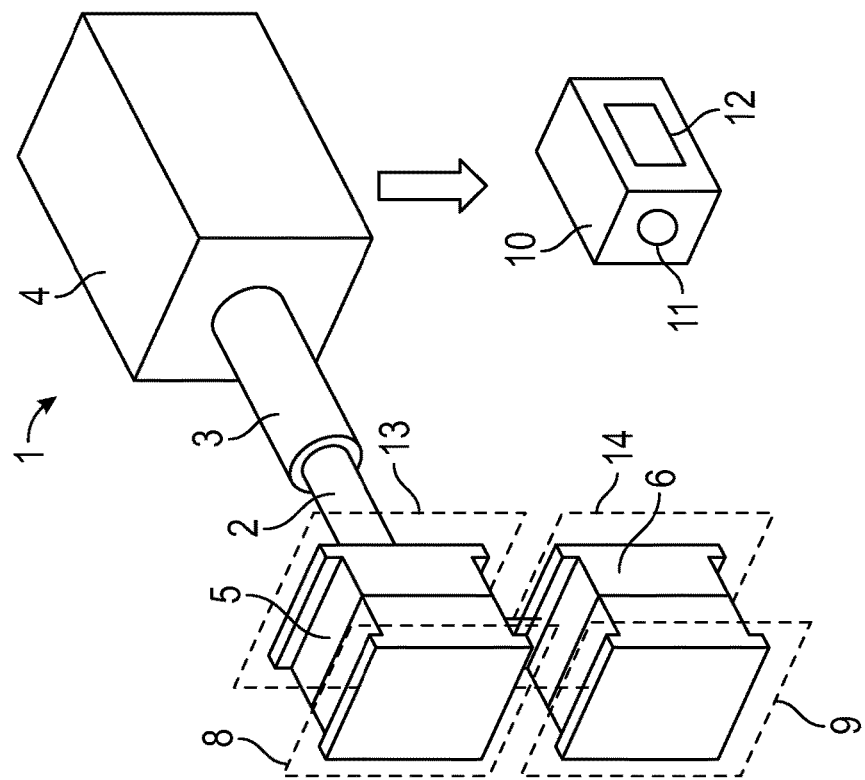

FIG. 5 illustrates another exemplary embodiment of the injection molding system 1. In FIG. 5, the conveying direction of the injection unit 4 is in a Z-axis direction. Thus, the arrangement of the mold A 5 and the mold B 6 is in a Z-axis direction. The configuration of FIG. 5 differs from the configuration of FIG. 4 only in that the fixed platen 7 is divided into a first fixed platen 13 and a second fixed platen 14.

Figure 6:
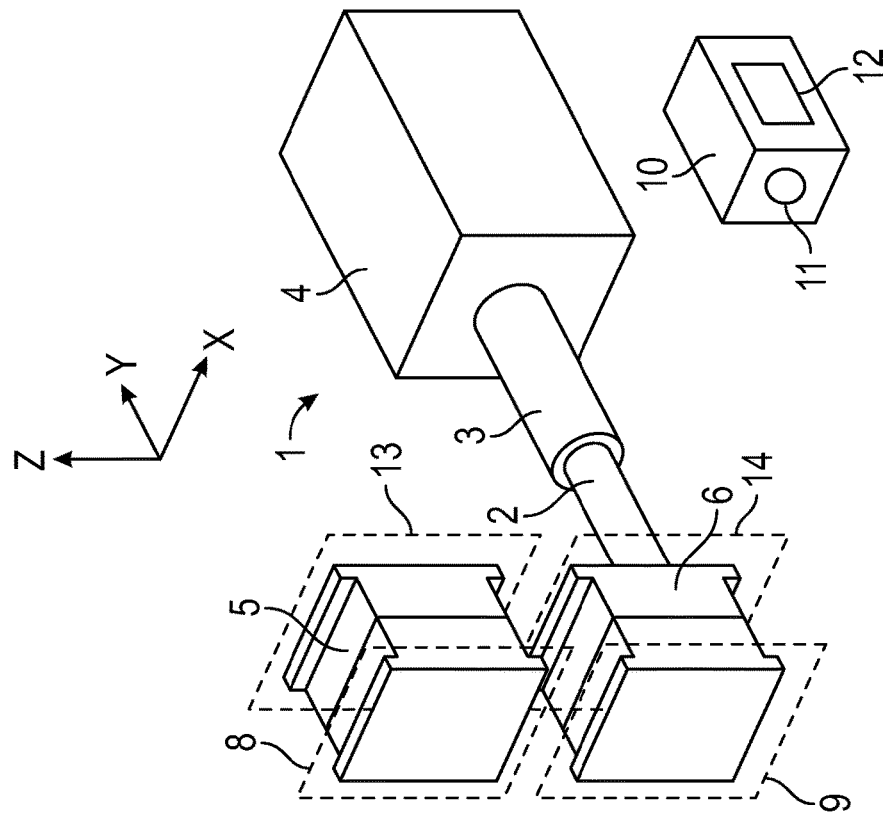
FIG. 6 illustrates an injection molding system according to yet another exemplary embodiment.
Figure 6:
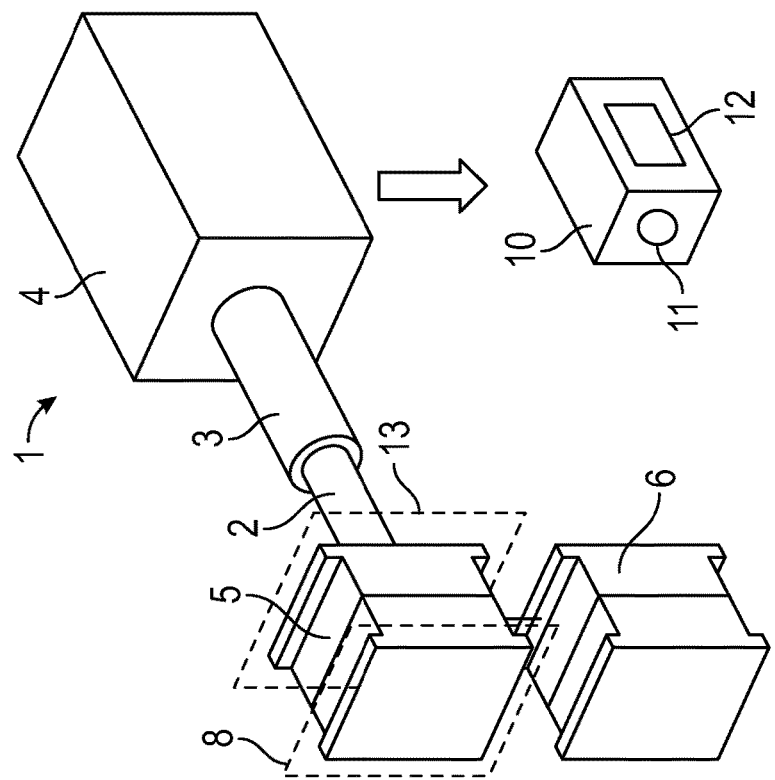

FIG. 6 illustrates another exemplary embodiment of the injection molding system 1. In FIG. 6, the conveying direction of the injection unit 4 is in the Z-axis direction. Thus, the arrangement of the mold A 5 and the mold B 6 is in a Z-axis direction. The configuration of FIG. 6 differs from the configuration of FIG. 5 only in that a second fixed platen 14 and second movable platen 9 do not exist

DEFINITIONS

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An injection molding system comprising:
    an injection nozzle configured to inject, via an injection cylinder, resin into a mold;
    a conveying device configured to convey the injection nozzle between a first position where the injection nozzle injects resin into a first mold and a second position where the injection nozzle injects resin into a second mold, and
    a controller configured to switch an operational mode of the injection molding system between a first mode where initiating rotation of a screw of the injection cylinder occurs after the injection nozzle is moved from one of the first position and the second position to the other of the first position and the second position and a second mode where initiating forward rotation of the screw of the injection cylinder occurs while the conveying device conveys the injection nozzle.

2. The injection molding system according to claim 1, further comprising a clamping device configured to secure the first mold and the second mold, wherein the mold clamping device comprises:
    a fixed platen common to both the first mold and the second mold,
    a first movable platen associated with the first mold, and
    a second movable platen associated with the second mold.

3. The injection molding system according to claim 1, further comprising a clamping device configured to secure the first mold and the second mold, wherein the clamping device comprises:
    a first fixed platen associated with the first mold,
    a second fixed platen associated with the second mold,
    a first movable platen associated with the first mold, and
    a second movable platen associated with the second mold.

4. The injection molding system according to claim 1, wherein:
    the first mold and the second mold are both arranged in a horizontal direction, and
    the conveying device conveys the injection nozzle in a horizontal direction.

5. The injection molding system according to claim 1, wherein:
    the first mold and the second mold are both arranged in a vertical direction, and
    the conveying device conveys the injection nozzle in a vertical direction.

6. The injection molding system according to claim 5, further comprising a take-out robot configured to approach the first mold from above the first mold to take out a molded part from the first mold and to approach the second mold from a side of the second mold to take out a molded part from the second mold, wherein the first mold is located higher than the second mold in the vertical direction.

7. The injection molding system according to claim 1, further comprising:
    a detector configured to detect that a molded part is being removed from a mold,
    wherein the controller is configured to prevent the conveying device from moving the injection nozzle at least while it is detected that the molded part is being removed.

8. The injection molding system according to claim 7, further comprising a display panel configured to display a message that movement of the injection nozzle is prohibited due to the molded part being removed.

9. The injection molding system according to claim 8, further comprising a button, the selection of which results in removal of the prohibition preventing movement of the injection nozzle.

10. The injection molding system according to claim 1 wherein the conveying device conveys the injection nozzle from the first position to the second position after an injection process with the first mold completes, and after the injection nozzle is moved to the second position, initiating rotation of a screw of an injection cylinder.

11. The injection molding system according to claim 1, wherein while the conveying device conveys the injection nozzle from the first position to the second position after completing an injection process into the first mold, initiating rotation of a screw of an injection cylinder.

12. The injection molding system according to claim 1, wherein the controller is configured to switch an operational mode of the injection molding system between a first mode where initiating rotation of the screw of the injection cylinder occurs before the injection nozzle begins to move to the second position and a second mode where initiating rotation of the screw of the injection cylinder occurs while the conveying device conveys the injection nozzle.

13. The injection molding system according to claim 1, wherein the controller is configured to determine a drip parameter that represents a tendency of the resin to be injected into the second mold and to determine, based on the drip parameter, whether to initiate operation of the injection cylinder after the conveying device completes conveying the injection nozzle from the first position to the second position.

14. The injection molding system according to claim 13, wherein the drip parameter is at least one a pressure during kneading of the resin, a temperature of the injection nozzle, or a temperature of the injection cylinder used to inject the resin.

15. The injection molding system according to claim 14, wherein the controller is configured to initiate rotation of the screw of the injection cylinder after completion of conveying the injection nozzle if a drip parameter is greater than a predetermined threshold value or to initiate rotation of the screw of the injection cylinder while conveying the injection nozzle if the drip parameter of the resin is less than or equal to the predetermined threshold value.

16. The injection molding system according to claim 1, wherein the controller is configured to determine a parameter that represents a tendency of the resin to be injected into the second mold to drip and to determine, based on the parameter, whether to initiate rotation of the screw of the injection cylinder after the conveying device completes conveying the injection nozzle from the first position to the second position or to initiate rotation of the screw of the injection cylinder before the conveying device conveys the injection nozzle from the first position to the second position.

17. The injection molding system according to claim 16, wherein the controller is configured to initiate rotation of the screw of the injection cylinder after conveying the injection nozzle from the first position to the second position if a drip parameter of the resin to be injected into the second mold is greater than a predetermined threshold value and to initiate rotation of the screw of the injection cylinder before conveying the injection nozzle if the drip parameter of the resin is less than or equal to the predetermined threshold value.

18. The injection molding system according to claim 13, wherein the drip parameter is at least one of a melt index (MI) and a melt flow rate (MFR).

* * * * *